US010733526B2

(12) United States Patent
Nogayama (10) Patent No.: US 10,733,526 B2
(45) Date of Patent: Aug. 4, 2020

(54) ESTIMATION OF LATENT WAITING AND SERVICE TIMES FROM INCOMPLETE EVENT LOGS

(71) Applicant: INTERNATIONAL BUSINESS MACHINES CORPORATION, Armonk, NY (US)

(72) Inventor: Takahide Nogayama, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 869 days.

(21) Appl. No.: 14/964,303

(22) Filed: Dec. 9, 2015

(65) Prior Publication Data

US 2017/0169338 A1 Jun. 15, 2017

(51) Int. Cl.
*G06N 20/00* (2019.01)

(52) U.S. Cl.
CPC .................................... *G06N 20/00* (2019.01)

(58) Field of Classification Search
CPC .. G06N 7/005; G06N 20/00; G06Q 10/06312; G06Q 10/00
See application file for complete search history.

(56) References Cited

U.S. PATENT DOCUMENTS 8,527,311 B2 9/2013 Chobantonov
8,577,827 B1 * 11/2013 Sehn .................. H04L 67/2823
                                                                370/252
2011/0093253 A1 * 4/2011 Kraft ................... G06F 11/3419
                                                                703/21
2014/0058789 A1 2/2014 Doehring
2014/0164050 A1 6/2014 Jojgov
2016/0226745 A1 * 8/2016 Tran ..................... H04L 41/5009

FOREIGN PATENT DOCUMENTS

CN 101957760 1/2011
JP 2014215917 A * 11/2014

OTHER PUBLICATIONS

Kuo, Yong-Hong, Janny MY Leung, and Colin A. Graham. "Simulation with data scarcity: developing a simulation model of a hospital emergency department." In Simulation Conference (WSC), Proceedings of the 2012 Winter, pp. 1-12. IEEE, 2012. (Year: 2012).*

Minka, Thomas P. "Estimating a Gamma distribution." Microsoft Research, Cambridge, UK, Tech. Rep (2002). (Year: 2002).*

(Continued)

*Primary Examiner* — Vincent Gonzales
*Assistant Examiner* — Casey R. Garner
(74) *Attorney, Agent, or Firm* — Tutunjian & Bitetto, P.C.; Vazken Alexanian (57) ABSTRACT

Methods and systems for estimating latent service and latent wait times include extracting transition times between activities from a partial event log. Parameters for respective gamma distributions are estimated that characterize latent waiting time and latent service time for each activity. A latent waiting time and latent service time for each activity is estimated based on the estimated parameters using a processor.

19 Claims, 5 Drawing Sheets (56) References Cited

OTHER PUBLICATIONS

Janiesch, Christian, Martin Matzner, and Oliver Müller. "Beyond process monitoring: a proof-of-concept of event-driven business activity management." Business Process Management Journal 18, No. 4 (2012): 625-643. (Year: 2012).*
Lanz, Andreas, Barbara Weber, and Manfred Reichert. "Time patterns for process-aware information systems." Requirements Engineering 19, No. 2 (2014): 113-141. (Year: 2014).*
Christian, Ivan, Sangman Moh, Ilyong Chung, and Jinyi Lee. "Spectrum mobility in cognitive radio networks." IEEE Communications Magazine 50, No. 6 (2012): 114-121. (Year: 2014).*
Scharf, Michael. "On the response time of the large-scale composite Web services." In Proceedings of the 19th International Teletraffic Congress (ITC 19), Beijing, pp. 1807-1816. 2005. (Year: 2005).*
Brelsford, William M., and Richard H. Jones. "Estimating probabilities." Mon. Wea. Rev 95 (1967): 570-576. (Year: 1967).*
Frederik Leonhardt, Event Log Analysis for Operational Decision Support in BPM, May 2014.
A.P. Dempster, Maximum Likelihood from Incomplete Data Via the EM Algorithm, Journal of the Royal Statistical Society. Series B (Methodological), vol. 39, No. 1., Dec. 8, 1976, pp. 1-38.
Arjel D. Bautista, Process Mining-Driven Optimization of a Consumer Loan Approvals Process, The BPIC 2012 Challenge, BPM 2012 International Workshops, Tallinn, Estonia, Sep. 3, 2012. Revised Papers, pp. 219-220.
W.M.P. van der Aalst, Time Prediction Based on Process Mining, Information Systems, vol. 36, Issue 2, Apr. 2011, pp. 450-475.
S. Ahmad, Process Capability Analysis for Non-normal Quality Characteristics Using Gamma Distribution, Information Technology, 2007. ITNG '07. Fourth International Conference on Apr. 2-4, 2007, pp. 425-430.

* cited by examiner

ESTIMATION OF LATENT WAITING AND SERVICE TIMES FROM INCOMPLETE EVENT LOGS

BACKGROUND

Technical Field

The present invention relates to process analysis and, more particularly, to estimating waiting and service times from incomplete event logs.

Description of the Related Art

Performance analysis is frequently used in redesigning processes to increase their efficiency. One frequently used type of analysis is calculation of waiting time and service time of process activities from an event log. The average waiting and service times of individual activities and resources enable the redesigner to discover bottlenecks in the process.

Process management tools (e.g., a process aware information system (PAIS)) will record event details. For example, a PAIS may record both start-event and end-event activity for a variety of events. This makes calculating service time and waiting time trivial, simply by subtracting event timestamps.

However, it is not always possible to access both start- and end-event information. In many legacy event logs, only one of the two types of information will be recorded. One example of such an event log is in, for example, webserver logs, which record only the start time of an event and do not record the time at which the event completes.

In such a case, the only information available is the transition time from one event to the next (i.e., the time between respective start-event timestamps or respective end-event timestamps). While more modern process managers will handle both, some customers may wish to have analyses of process timing to improve their existing, legacy systems.

SUMMARY

A method for estimating latent service and latent wait times includes extracting transition times between activities from a partial event log. Parameters for respective gamma distributions are estimated that characterize latent waiting time and latent service time for each activity. A latent waiting time and latent service time for each activity is estimated based on the estimated parameters using a processor.

A method for estimating latent service and latent wait times includes extracting transition times between activities from a partial event log that comprises only one of start-event information and end-event information for each activity. Parameters for respective gamma distributions are estimated that characterize latent waiting time and latent service time for each activity. Estimating the parameters includes determining a likelihood that the estimated parameters would reproduce the partial event log and iterating the estimation of parameters and the determination of the likelihood until the likelihood converges. A latent waiting time and latent service time for each activity is estimated based on the estimated parameters using a processor.

A system for estimating latent service and latent wait times includes a transition time module configured to extract transition times between activities from a partial event log. A parameter module is configured to estimate parameters for respective gamma distributions that characterize latent waiting time and latent service time for each activity. A latent time module having a processor is configured to estimate a latent waiting time and latent service time for each activity based on the estimated parameters.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present principle access transition times between events from an incomplete log that lacks either event start times or event end times. The present embodiments characterize the distribution of time durations as a gamma distribution and estimates a latent waiting time and a latent service time for each transition.

Figure 1:
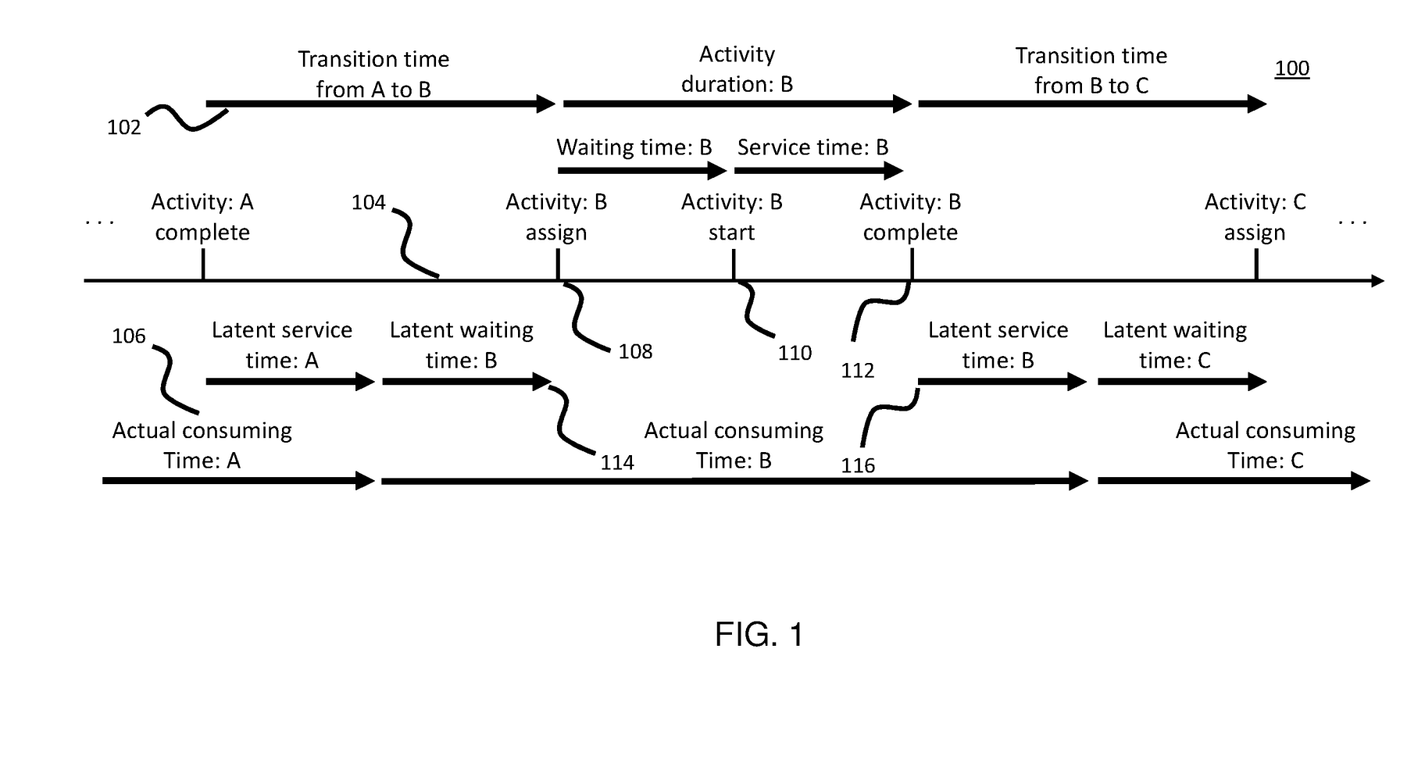
FIG. 1 is a diagram showing a timeline of activity execution in accordance with the present principles.

Referring now to FIG. 1, an exemplary event timeline 100 is shown. This timeline 100 represents an ideal set of circumstances, where the top 102 of the timeline shows events that are observable event and performance indicators, the bottom 106 of the timeline shows unobservable performance indicators, and the timeline itself 104 shows the recorded events in the log. A series of activities (A, B, C) are recorded on the timeline 104, with each having an "assign" event 108, marking the point in time when a request for the activity was received, a "start" event 110, marking the point in time when the event actually begins, and a "complete" event 112, marking the point in time when the event completes.

Because so much information was collected, a time for the transitions between activities and a time for the duration of an activity can be observed on the top portion of the timeline 102. The duration of an activity in this view includes a waiting time, representing the time that expires between the request 108 for the activity and the time the activity begins 110. The duration also includes a service time, which represents the time from the start of the activity 110 to the completion of the activity. The duration is then followed by a transition period, until the next activity is assigned.

While the events recorded on the timeline 104 are available, they may not represent the true duration of the event. In addition to the observable times, there may be a latent waiting time 114 for the activity and a latent service time 116 for the activity. Latent waiting time 114 is defined as the time period from passing control to the activity to the first event of the activity. Latent service time 116 is defined as the time period from the last event of the activity to passing control to another activity. In addition to the observed waiting and service times, these times form the actual time consumed by an activity. This allows the transition time to be split between the source and destination activities.

Figure 2:
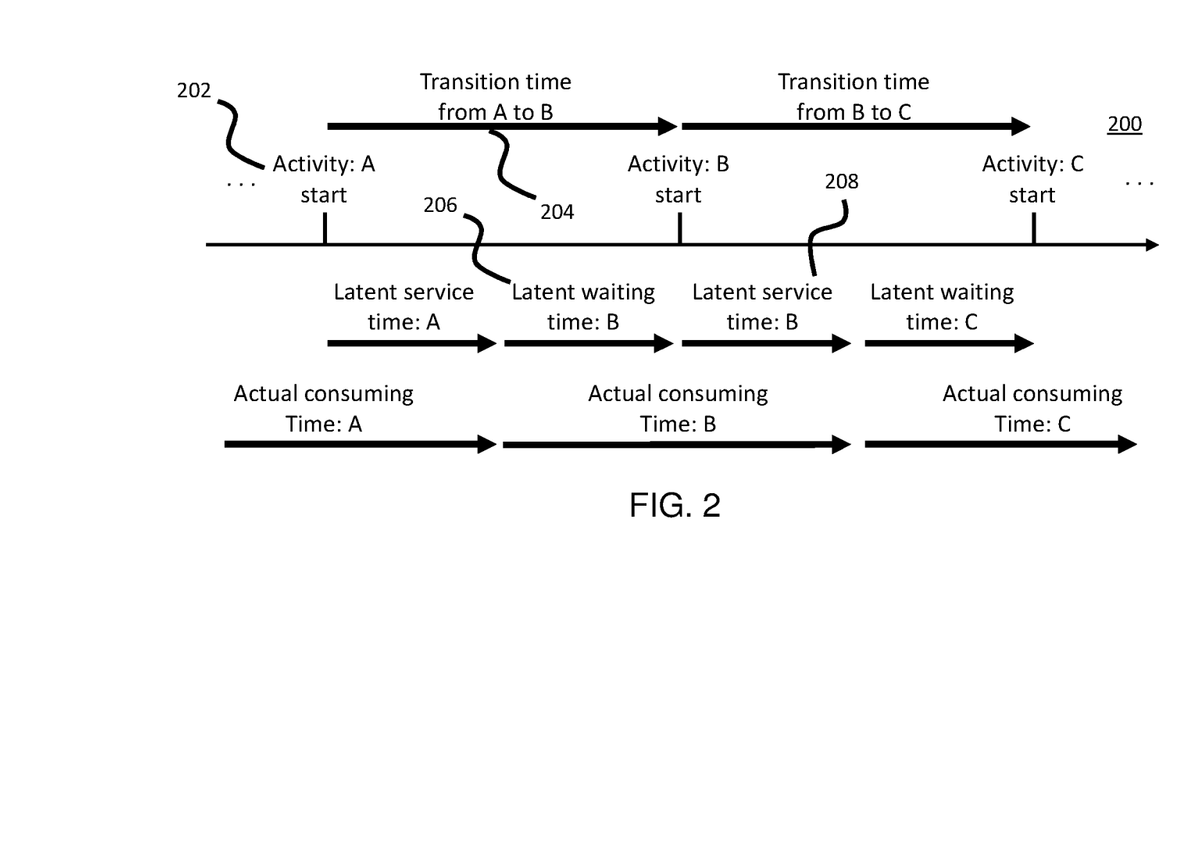
FIG. 2 is a diagram showing a timeline of activity execution in accordance with the present principles.

Referring now to FIG. 2, a second timeline 200 is shown. Rather than keeping accurate timing information for the assignment, start, and stop of the events, in this second timeline 200 only the starting times 202 are recorded. As a result, all that is observable is the transition time 204 from one start time 202 to the next. The transition time is again divided into a latent waiting time 206 and a latent service time 208. The present embodiments use a gamma distribution to estimate the latent waiting time 206 and latent service time 208.

Figure 3:
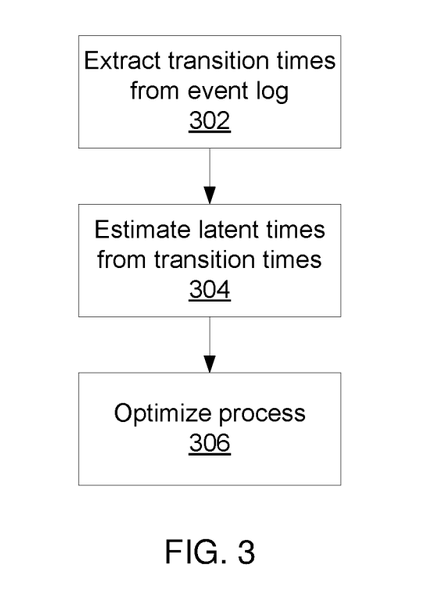
FIG. 3 is a block/flow diagram of a method for optimizing a process in accordance with the present principles.

Referring now to FIG. 3, a method for finding the latent waiting and service times is shown. Block 302 extracts transition times between activities from an event log. As noted above, the event log is incomplete and shows only start-events or only end-events. Block 304 then estimates the latent times from the transition times using, for example, a gamma distribution. This information can then be used to optimize the process, providing improvements for future activities to reduce latent waiting time and latent service time. For example, if the waiting time of an activity is too long, then additional resources may be provisioned to reduce the length of the queue. If the service time of the activity is too long, it may be possible to simplify the task involved to reduce the amount of time needed to complete it.

Figure 4:
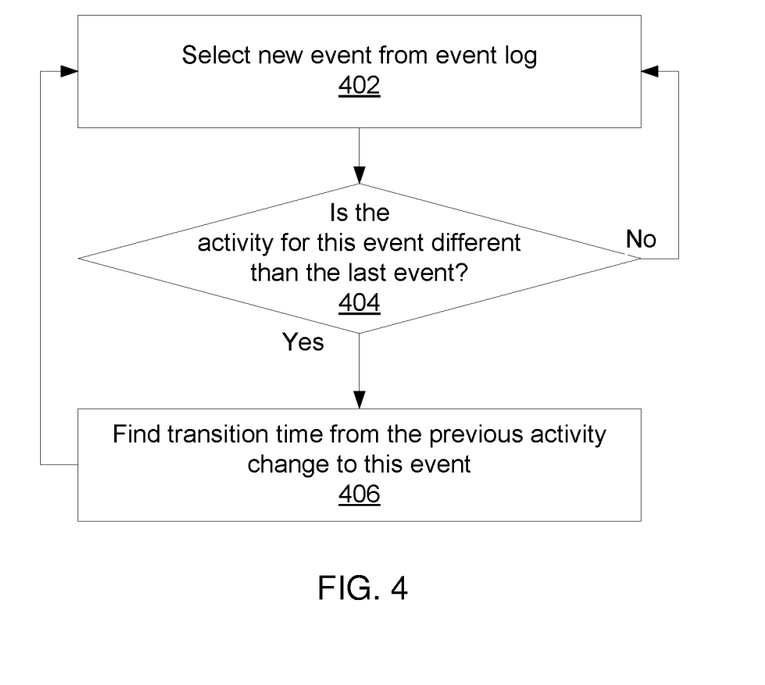
FIG. 4 is a block/flow diagram of a method for extracting transition times from a partial event log in accordance with the present principles.

Referring now to FIG. 4, a method for extracting the transition times between activities is shown. Block 402 selects a new event from an event log. As noted above, the event log includes only one of start-events and end-events, signaling the beginning or end of an activity, respectively. Other events may be present in the event log, however, so the present embodiments cycle through the events until the activity changes (i.e., until a start-event or end-event for a new activity comes up). Thus, if the activity for the event selected by block 402 is the same as the activity for the previous event at block 404, block 402 selects a new event. If not, block 406 finds the transition time from the previous activity change to the present event.

The present embodiments use a gamma distribution model to determine latent waiting times and latent service times from the transition times. The gamma distribution is a sum of exponential distributions, which in term is used to model a time duration of a single activity and lifetime. An exponential distribution alone cannot fit actual duration data for most practical activities because the actual activities are composed of several small activities. For example, underwriting in insurance includes reviewing an incoming application, measuring risk exposure, and determining the premium. By combining exponential distributions, the gamma distribution has enough flexibility to model the time duration of such complex activities.

A gamma distribution is a two-parameter family of continuous probability distributions. Its probability density function over a probabilistic variable X>0 is defined by:

$$p(X; l, a) = \frac{X^{l-1}}{\Gamma(l)\alpha^l} e^{\frac{x}{a}}$$

with a shape parameter l>0 and a scale parameter α>0, where Γ(x) is the gamma function $\Gamma(x) = \int_0^\infty s^{x-1} e^{-s} ds$. X~Gamma(l, α) if a probabilistic variable X has this distribution.

Given an activity transition time log TL, as generated by FIG. 4 above, the random variable of latent service time of a source activity a is $S_a$ and the random variable of latent waiting time of a destination activity b is $W_b$. It is assumed that $S_a$ follows a probabilistic distribution Gamma($l_a$, $\alpha_a$), where $l_a$>0, $\alpha_a$>0, and that $W_b$ follows a probabilistic distribution Gamma($m_b$, $\beta_b$), where $m_b$>0, $\beta_b$>0. This assumption is based on the Markov property, such that the probability of time is independent from past events of the process instance, whereas several process mining methods use past events. Since latent variable estimation imposes complex modeling and mathematics, the problem definition is simplified herein.

The transition time from source activity a to destination activity b is $T_{ab}$. Based on the above assumption, $T_{ab} = S_a + W_b$. The probabilistic density function of $T_{ab}$ can be obtained from a convolutional integration of $p(S_a; l_a, \alpha_a) * p(W; m_b, \beta_b)$ as:

$$p(T_{ab}; l_a, \alpha_a, m_b, \beta_b) = \int_0^{T_{ab}} p(S_a; l_a, \alpha_a) p(T_{ab} - S_a; m_b, \beta_b) dS_a$$

$$= \frac{e^{\frac{(T_{ab})}{\beta_b}}}{\Gamma(l_a)\Gamma(m_b)\alpha_a^{l_a}\beta_b^{m_b}} f(T_{ab}, l_a, \alpha_a, m_b, \beta_b)$$

where $$f(t, l, \alpha, m, \beta) = \int_0^t z^{l-1}(t-z)^{m-1} e^{\left(\frac{1}{\beta} - \frac{1}{\alpha}\right)z} dz$$

In one example, the latent time is not shared with other transition time. In that case, a single gamma distribution cannot be decomposed into two gamma distributions because the distribution has the reproductive property. For example, if X~Gamma(2, θ) and Y~Gamma(3, θ), then X+Y follows Gamma(5, θ).

It can be assumed that the transition time from a source activity to different destination activities shares the same latent service time at the transition source. In addition, transition times from different sources to one destination share the same latent waiting time at that transition destination. The latent services can be estimated if the inverse problem is solved.

Given an activity transition time log TL, the average latent waiting time $\overline{w}_a$, the average latent service time $\overline{s}_a$, and the average consuming time $\overline{c}_a$, of the activity a, the first step is an inference of model parameters of $p(T_{ab}; l_a, \alpha_a, m_b, \beta_b)$. In these embodiments, $l_a$ is a shape parameter, $\alpha_a$ is a scale parameter of a gamma distribution of latent service time of a, $m_a$ is a shape parameter, and $\beta_a$ is a scale parameter of a gamma distribution of latent waiting time for the activity a. Estimators $\hat{l}_a$, $\hat{\alpha}_a$, $\hat{m}_b$, and $\hat{\beta}_a$ for the activity a are obtained and the estimator of $\overline{s}_a$ is then obtained as $\hat{l}_a\hat{\alpha}_a$, the estimator of $\overline{w}_a$ can be obtained as $\hat{m}_b\hat{\beta}_a$, and the estimator of $\overline{c}_a$ can be obtained as the $\overline{s}_a$+duration$_a$+$\overline{w}_a$. An average time is defined as a triplet AT=($\overline{s}$, $\overline{w}$, $\overline{c}$), where $\overline{s}$ is a set of estimated average latent service times, $\overline{w}$ is a set of estimated average latent waiting times, and $\overline{c}$ is a set of estimated average consuming time.

Maximum likelihood estimation (MLE) is used to find estimators that make the observed data most probable. Assuming the latent waiting time and the latent service time follow a gamma distribution, the log likelihood function becomes:

$$\log L = \sum_{(a,b) \in Trans} \log p(t_{abk}; l_i, \alpha_i, m_j, \beta_j)$$

$$= \sum_{(a,b) \in Trans} \sum_{k=1}^{n_{ab}} \log \frac{e^{\frac{t_{abk}}{\beta_b}}}{\Gamma(l_a)\Gamma(m_b)\alpha_a^{l_a}\beta_b^{m_b}} f(t_{abk}, l_a, \alpha_a, m_b, \beta_b)$$

where $t_{abk}$ is the $k^{th}$ observed transition time from the source activity a to the destination activity b and $n_{ab}$ is the number of observed transition times from a to b. The parameters that give the maximization cannot be solved explicitly with equation transformations because the latent probabilistic model makes the log likelihood function too complex. In this formulation, "Trans" is the set of transitions between activities.

Expectation maximization (EM) is used to find maximum likelihood solutions for probabilistic models having latent variables. In this case, the observed variables are $T_{ab}$ and the latent variables are $S_a$. The latent waiting time is removed from consideration by the relationship $W_b = T_{ab} - S_a$. EM maximizes the likelihood iteratively with the expectation and maximization steps.

In the expectation step a distribution $q_a(S_a)$ is defined over the latent variable $S_a$. For any choice of $q_a(S_a)$, the log likelihood function is decomposed to:

$$\log p(t_{abk}; l_i, \alpha_i, m_j, \beta_j) = \mathcal{L}(q_a(S_a), t_{abk}) + D_{KL}(q_a(S_a) \| p(S_a | t_{abk}))$$

where $$\mathcal{L}(q_a(S_a), t_{abk}) = \int_0^{t_{abk}} q_a(S_a) \log \frac{p(t_{abk}, S_a; l_a, \alpha_a, m_b, \beta_b)}{q_a(S_a)} dS_a$$

$$D_{KL}\Big(q_a(S_a) \| p(S_a | t_{abk})\Big) = \int_0^{t_{abk}} q_a(S_a) \log \frac{q_a(S_a)}{p(t_{abk}, S_a; l_a, \alpha_a, m_b, \beta_b)} dS_a$$

Choosing $p(t_{abk}, S_a; l_a, \alpha_a, m_b, \beta_b)$ as $q_a(S_a)$, the Kullback-Leibler divergence goes to zero and $L(q_a(S_a), t_{abk})$ equals the log likelihood function.

In the maximization step, the parameters that maximize $L(q_a(S_a), t_{abk})$ are found, holding $q_a(S_a) = p(S_a | t_{abk}; l_a, \alpha_a, m_b, \beta_b)$ are determined. The updated parameters are $l'_a, \alpha'_a, m'_a$, and $\beta'_a$. By vanishing a constant part $-\int_0^{t_{abk}} q_a(S_a) \log q_a(S_a) dS_a$ from $L(q_a(S_a), t_{abk})$, maximizing $L(q_a(S_a), t_{abk})$ is equivalent to maximizing:

$$Q = \sum_{(a,b) \in Trans} \sum_{k=1}^{n_{ab}} \int_0^{t_{abk}} p(S_a | t_{abk}; l_a, \alpha_a, m_b, \beta_b)$$

$$\log p(t_{abk}, S_a; l'_a, \alpha'_a, m'_b, \beta'_b) dS_a$$

By substituting the joint probability $$p(T, S; l, \alpha, m, \beta) = p(S; l, \alpha) p(T - S; m, \beta) = \frac{S^{l-1}(T-s)^{m-1}}{\Gamma(l)\Gamma(m)\alpha^l \beta^m} e^{-\frac{T}{\beta}} e^{\left(\frac{1}{\beta} - \frac{1}{\alpha}\right)s}$$

and the posterior probability $$p(S | T; l, \alpha, m, \beta) = \frac{p(S, T)}{p(T)} = \frac{S^{l-1}(T-s)^{m-1}}{f(T, l, \alpha, m, \beta)} e^{\left(\frac{1}{\beta} - \frac{1}{\alpha}\right)s}$$

into Q produces:

$$Q = \sum_{(a,b) \in Trans} \sum_{k=1}^{n_{ab}} \Big\{ -\frac{t_{abk}}{\beta'_b} - \log\Gamma(l'_a) - \log\Gamma(m'_b) - l'_a \log\alpha'_a -$$

$$m'_b \log\beta'_b + \left(\frac{1}{\beta'_b} - \frac{1}{\alpha'_a}\right)\left(\frac{f(t_{abk}, l_a + 1, \alpha_a, m_b, \beta_b)}{f(t_{abk}, l, \alpha_a, m_b, \beta_b)}\right) + (l'_a - 1)$$

$$\left(\frac{g(t_{abk}, l_a, \alpha_a, m_b, \beta_b)}{f(t_{abk}, l_a, \alpha_a, m_b, \beta_b)}\right) + (m'_b - 1)\left(\frac{h(t_{abk}, l_a, \alpha_a, m_b, \beta_b)}{f(t_{abk}, l_a, \alpha_a, m_b, \beta_b)}\right)\Big\}$$

where $$g(t, l, \alpha, m, \beta) = \int_0^t z^{l-1}(t-z)^{m-1} e^{\left(\frac{1}{\beta} - \frac{1}{\alpha}\right)z} \log z \, dz$$

$$h(t, l, \alpha, m, \beta) = \int_0^t z^{l-1}(t-z)^{m-1} e^{\left(\frac{1}{\beta} - \frac{1}{\alpha}\right)z} \log(t-z) \, dz$$

The optimal point that gives the maximal value of Q satisfies:

$$\frac{\partial Q}{\partial \alpha'_a} = -\frac{l'_a}{\alpha'_a} \sum_{b \in A_d} n_{ab} + \frac{1}{\alpha'^2_a} \sum_{b \in A_d} \sum_{k=1}^{n_{ab}} \frac{f(t_{abk}, l_a + 1, \alpha_a, m_b, \beta_b)}{f(t_{abk}, l, \alpha_a, m_b, \beta_b)} = 0$$

$$\frac{\partial Q}{\partial \beta'_a} = -\frac{l'_a}{\beta'_a} \sum_{a \in A_s} n_{ab} + \frac{1}{\beta'^2_a} \sum_{a \in A_s} \sum_{k=1}^{n_{ab}} \left(t_{abk} - \frac{f(t_{abk}, l_a + 1, \alpha_a, m_b, \beta_b)}{f(t_{abk}, l, \alpha_a, m_b, \beta_b)}\right) = 0$$

$$\frac{\partial Q}{\partial l'_a} = -(\psi(l'_a) - \log\alpha'_a) \sum_{b \in A_b} n_{ab} + \sum_{b \in A_d} \sum_{k=1}^{n_{ab}} \frac{g(t_{abk}, l_a, \alpha_a, m_b, \beta_b)}{f(t_{abk}, l_a, \alpha_a, m_b, \beta_b)} = 0$$

$$\frac{\partial Q}{\partial m'_a} = -(\psi(m'_b) - \log\beta'_b) \sum_{a \in A_s} n_{ab} + \sum_{a \in A_s} \sum_{k=1}^{n_{ab}} \frac{h(t_{abk}, l_a, \alpha_a, m_b, \beta_b)}{f(t_{abk}, l_a, \alpha_a, m_b, \beta_b)} = 0$$

where $A_s$ is the set of source activities, $A_d$ is the set of destination activities, and $\psi(x)$ is the logarithmic derivative of the gamma function (known as the digamma function):

$$\psi(x) = \frac{d}{dx} \ln \Gamma(x) = \frac{d\Gamma(x)}{dx} \Big/ \Gamma(x)$$

By substituting $$\frac{\partial Q}{\partial \alpha'_a}$$

into the above equation for $$\frac{\partial Q}{\partial l'_a} \text{ and } \frac{\partial Q}{\partial \beta'_a}$$

into $$\frac{\partial Q}{\partial m'_a},$$

the following nonlinear equations are produced:

$$\psi(l'_a) - \log(l'_a) - \frac{1}{\sum_{b \in A_d} n_{ab}} \sum_{b \in A_d} \sum_{k=1}^{n_{ab}} \frac{g(t_{abk}, l_a, \alpha_a, m_b, \beta_b)}{f(t_{abk}, l_a, \alpha_a, m_b, \beta_b)} +$$

$$\log\left(\frac{1}{\sum_{b \in A_d} n_{ab}} \sum_{b \in A_d} \sum_{k=1}^{n_{ab}} \frac{f(t_{abk}, l_a + 1, \alpha_a, m_b, \beta_b)}{f(t_{abk}, l_a, \alpha_a, m_b, \beta_b)}\right) = 0$$

$$\psi(m'_b) - \log(m'_b) - \frac{1}{\sum_{a \in A_s} n_{ab}} \sum_{a \in A_s} \sum_{k=1}^{n_{ab}} \frac{h(t_{abk}, l_a, \alpha_a, m_b, \beta_b)}{f(t_{abk}, l_a, \alpha_a, m_b, \beta_b)} +$$

$$\log\left(\frac{1}{\sum_{a \in A_s} n_{ab}} \sum_{a \in A_s} \sum_{k=1}^{n_{ab}} \left(t_{abk} - \frac{f(t_{abk}, l_a + 1, \alpha_a, m_b, \beta_b)}{f(t_{abk}, l_a, \alpha_a, m_b, \beta_b)}\right)\right) = 0$$

The optimal parameters, $l'_a$ and $m'_b$, are given by solving these nonlinear, one-variable equations. By substituting the parameters back into $$\frac{\partial Q}{\partial \alpha'_a} \text{ and } \frac{\partial Q}{\partial \beta'_a},$$

the optimal parameters $\alpha'_a$ and $\beta'_b$ are produced:

$$\alpha'_a = \frac{1}{l'_a \sum_{b \in A_d} n_{ab}} \sum_{b \in A_d} \sum_{k=1}^{n_{ab}} \frac{f(t_{abk}, l_a + 1, \alpha_a, m_b, \beta_b)}{f(t_{abk}, l_a, \alpha_a, m_b, \beta_b)}$$

$$\beta'_b = \frac{1}{m'_b \sum_{a \in A_s} n_{ab}} \sum_{a \in s} \sum_{k=1}^{n_{ab}} \left(t_{abk} - \frac{f(t_{abk}, l_a + 1, \alpha_a, m_b, \beta_b)}{f(t_{abk}, l_a, \alpha_a, m_b, \beta_b)}\right)$$

The latent service time is then calculated as $\bar{s}_a = l_a \alpha_a$, the latent waiting time is calculated as $\bar{w}_a = m_a \beta_a$, and the consuming time is calculated as $\bar{c}_a = lw_a + \text{duration}_a + ls_a$.

Figure 5:
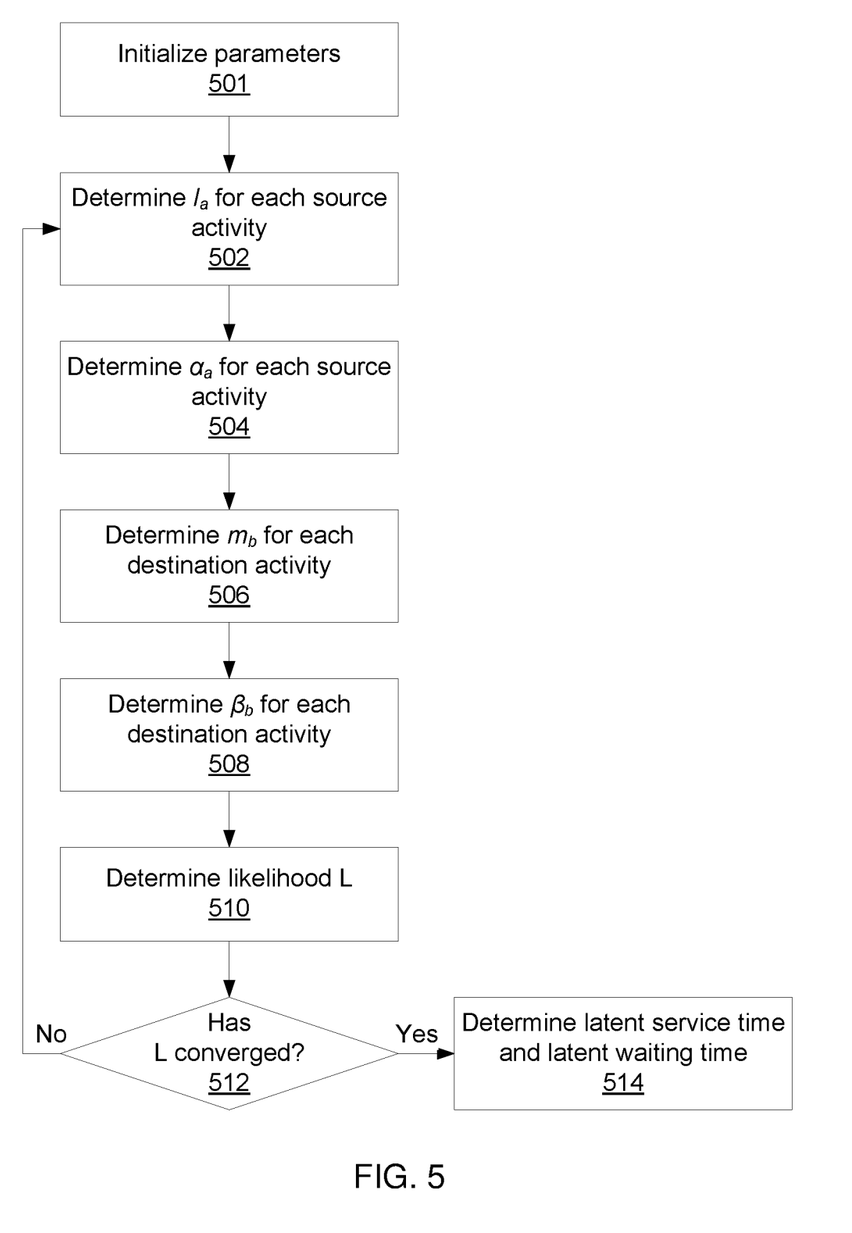
FIG. 5 is a block/flow diagram of a method for determining latent service and waiting times in accordance with the present principles.

Referring now to FIG. 5, a method for extracting the latent times from the transition times is shown. The present embodiment iteratively considers transition times from source activities to destination activities until a log likelihood function converges. Block 501 initializes the parameters, with the likelihood L being set to $-\infty$, and each of the parameters $l_a$, $\alpha_a$, $m_b$, and $\beta_b$ each being set to $(\Sigma_{(a,b) \in Trans} \Sigma_{k=0}^{n_{ab}} t_{abk})/(\Sigma_{(a,b) \in Trans} n_{ab})$.

Block 502 determines $l_a$ for each source activity, block 504 determines $\alpha_a$ for each source activity, block 506 determines $m_b$ for each destination activity, and block 508 determines $\beta_b$ for each destination activity. Using these parameters, a likelihood L is calculated as described above in block 510. Block 512 determines whether the likelihood has converged. If not, processing returns to block 502. If so, block 514 determines the latent service time and latent waiting time using the determined parameters. As the method iterates, the parameters from each iteration are used in the next iteration to form the basis for the next likelihood calculation. Eventually the likelihood will stabilize, as determined by a difference between two consecutive likelihoods being within a threshold value of one another.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 6:
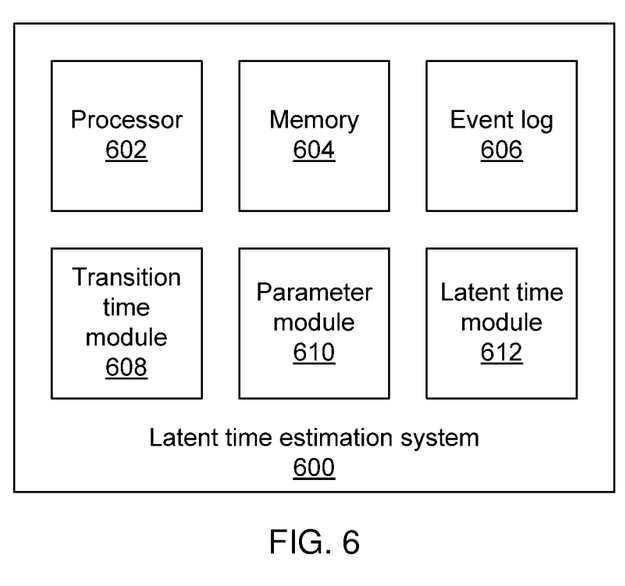
FIG. 6 is a block diagram of a latent time estimation system in accordance with the present principles.

Referring now to FIG. 6, a system 600 for estimating latent service and waiting times is shown. The system 600 includes a hardware processor 602 and memory 604. The system 600 also includes a set of functional modules. These modules may be implemented as software that is stored in memory 604 and executed on the processor 602 or may, alternatively, be implemented as one or more discrete hardware components in the form of, e.g., application specific integrated chips or field programmable gate arrays.

The memory stores an event log 606 that records partial event information in the memory 604 of an executed activity. For example, the event log 606 may record only start-event information or end-event information. Based on the event log, a transition time module 608 determines a transition time between different activities. This creates a transition time log. A parameter module 610 determines a set of latent time estimation parameters based on the transition time log and latent time module 612 produces an estimate of the latent waiting time and latent service time for each activity.

Having described preferred embodiments of estimation of latent waiting and service times from incomplete event logs (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for estimating latent service and latent wait times, comprising:
   extracting transition times between activities from a partial event log;
   estimating parameters for respective gamma distributions that characterize latent waiting time and latent service time for each activity based on the extracted transition times;
   estimating a latent waiting time and latent service time for each activity based on the estimated parameters using a processor; and
   provisioning computing resources to reduce the latent waiting time.

2. The method of claim 1, further comprising determining a likelihood that the estimated parameters would reproduce the partial event log.

3. The method of claim 2, further comprising iterating the estimation of parameters and the determination of the likelihood until the likelihood converges.

4. The method of claim 3, wherein the iteration ends when a likelihood from a previous iteration is within a threshold value of a likelihood from a current iteration.

5. The method of claim 2, wherein the likelihood is determined by:

$$\sum_{(a,b)\in Trans} \sum_{k=1}^{n_{ab}} \log \frac{e^{-\frac{t_{abk}}{\beta_b}}}{\Gamma(l_a)\Gamma(m_b)\alpha_a^{l_a}\beta_b^{m_b}} f(t_{abk}, l_a, \alpha_a, m_b, \beta_b)$$

wherein a is a source activity, b is a destination activity, $n_{ab}$ is a number of observed transition times from a to b, $t_{abk}$ is the $k^{th}$ transition time from a to b, $l_a$, $\alpha_a$, $m_b$, and $\beta_b$ are parameters of the gamma function $\Gamma(x)$, and $$f(t, l, \alpha, m, \beta) = \int_0^t z^{l-1}(t-z)^{m-1} e^{\left(\frac{1}{\beta}-\frac{1}{\alpha}\right)z} dz.$$

6. The method of claim 1, wherein the partial event log comprises only one of start-event information and end-event information for each activity.

7. The method of claim 1, wherein extracting transition times between activities comprises:
  determining a first event at which a source activity is first recorded in the partial event log; and
  determining a second event at which a destination activity is first recorded in the partial event log, wherein the transition time between the source activity and the destination activity is a difference in time between the first event and the second event.

8. The method of claim 1, wherein the latent service time is estimated as:

$$\bar{s}_a = l_a \alpha_a$$

wherein a is an activity, $l_a$ is a shape parameter of a gamma distribution for the activity, and $\alpha_a$ is a scale parameter of the gamma distribution for the activity.

9. The method of claim 1, wherein the latent waiting time is estimated as:

$$\bar{w}_a = m_a \beta_a$$

wherein a is an activity, $m_a$ is a shape parameter of a gamma distribution for the activity, and $\beta_a$ is a scale parameter of the gamma distribution for the activity.

10. A computer readable storage medium comprising a computer readable program for estimating latent service and latent wait times, wherein the computer readable program when executed on a computer causes the computer to perform the steps of:
  extracting transition times between activities from a partial event log;
  estimating parameters for respective gamma distributions that characterize latent waiting time and latent service time for each activity based on the extracted transition times;
  estimating a latent waiting time and latent service time for each activity based on the estimated parameters using a processor; and
  provisioning computing resources to reduce the latent waiting time.

11. A system for estimating latent service and latent wait times, comprising:
  a transition time module configured to extract transition times between activities from a partial event log;
  a parameter module configured to estimate parameters for respective gamma distributions that characterize latent waiting time and latent service time for each activity based on the extracted transition times; and
  a latent time module comprising a processor configured to estimate a latent waiting time and latent service time for each activity based on the estimated parameters, and to provision computing resources to reduce the latent waiting time, and to simplify a task relating to the estimated latent service time to reduce the latent service time.

12. The system of claim 11, wherein the parameter module is further configured to determine a likelihood that the estimated parameters would reproduce the partial event log.

13. The system of claim 12, wherein the parameter module is further configured to iterate the estimation of parameters and the determination of the likelihood until the likelihood converges.

14. The system of claim 13, wherein the parameter module is further configured to halt iteration when a likelihood from a previous iteration is within a threshold value of a likelihood from a current iteration.

15. The system of claim 12, wherein the likelihood is determined by:

$$\sum_{(a,b)\in Trans} \sum_{k=1}^{n_{ab}} \log \frac{e^{-\frac{t_{abk}}{\beta_b}}}{\Gamma(l_a)\Gamma(m_b)\alpha_a^{l_a}\beta_b^{m_b}} f(t_{abk}, l_a, \alpha_a, m_b, \beta_b)$$

wherein a is a source activity, b is a destination activity, $n_{ab}$ is a number of observed transition times from a to b, $t_{abk}$ is the $k^{th}$ transition time from a to b, $l_a$, $\alpha_a$, $m_b$, and $\beta_b$ are parameters of the gamma function $\Gamma(x)$, and $$f(t, l, \alpha, m, \beta) = \int_0^t z^{l-1}(t-z)^{m-1} e^{\left(\frac{1}{\beta}-\frac{1}{\alpha}\right)z} dz.$$

16. The system of claim 11, wherein the partial event log comprises only one of start-event information and end-event information for each activity.

17. The system of claim 11, wherein the transition time module is further configured to determine a first event at which a source activity is first recorded in the partial event log and to determine a second event at which a destination activity is first recorded in the partial event log, wherein the transition time between the source activity and the destination activity is a difference in time between the first event and the second event.

18. The system of claim 11, wherein the latent service time is estimated as:

$$\bar{s}_a = l_a \alpha_a$$

wherein a is an activity, $l_a$ is a shape parameter of a gamma distribution for the activity, and $\alpha_s$ is a scale parameter of the gamma distribution for the activity.

19. The system of claim 11, wherein the latent waiting time is estimated as:

$$\bar{w}_a = m_a \beta_a$$

wherein a is an activity, $m_a$ is a shape parameter of a gamma distribution for the activity, and $\beta_a$ is a scale parameter of the gamma distribution for the activity.

* * * * *